United States Patent
Cheong et al.

(10) Patent No.: US 9,497,515 B2
(45) Date of Patent: Nov. 15, 2016

(54) USER INTERFACE FOR ENTERTAINMENT SYSTEMS

(75) Inventors: Yuen-Keen Cheong, Milpitas, CA (US); Steven A. Hatch, Danvers, MA (US); Hoi L. Young, Pacifica, CA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/587,234

(22) Filed: Aug. 16, 2012

(65) Prior Publication Data

US 2014/0053210 A1 Feb. 20, 2014

(51) Int. Cl.
- H04N 21/422 (2011.01)
- H04N 21/462 (2011.01)
- H04N 21/482 (2011.01)
- H04N 21/658 (2011.01)

(52) U.S. Cl.
CPC .... *H04N 21/6581* (2013.01); *H04N 21/42203* (2013.01); *H04N 21/4622* (2013.01); *H04N 21/4828* (2013.01)

(58) Field of Classification Search
CPC .................. H04N 21/47; H04N 21/482; H04N 21/4828; H04N 21/6581; H04N 21/42203; H04N 21/4622
USPC ................ 725/37, 39, 44, 47–49, 52, 53, 59
See application file for complete search history.

(56) References Cited

U.S. PATENT DOCUMENTS

| | | | |
|---|---|---|---|
| 5,412,720 A | 5/1995 | Hoarty | |
| 5,774,859 A | 6/1998 | Houser et al. | |
| 5,826,233 A | 10/1998 | Matsumoto | |
| 6,233,559 B1 | 5/2001 | Balakrishnan | |
| 6,314,398 B1 | 11/2001 | Junqua et al. | |
| 6,718,307 B1 | 4/2004 | Buil et al. | |
| 6,757,656 B1 | 6/2004 | Gong et al. | |
| 7,047,554 B1 * | 5/2006 | Lortz | 725/149 |
| 7,085,723 B2 | 8/2006 | Ross et al. | |
| 7,319,480 B2 | 1/2008 | Akiyama et al. | |
| 7,321,857 B2 | 1/2008 | Rodriguez et al. | |
| 7,363,222 B2 | 4/2008 | Josenhans | |
| 7,398,209 B2 | 7/2008 | Kennewick et al. | |
| 7,437,296 B2 | 10/2008 | Inoue et al. | |
| 7,769,589 B2 | 8/2010 | Lee et al. | |
| 7,769,592 B2 | 8/2010 | Kemble et al. | |
| 7,865,927 B2 * | 1/2011 | Brodersen et al. | 725/53 |
| 8,041,716 B2 | 10/2011 | Daigle et al. | |
| 8,271,334 B1 | 9/2012 | Funk et al. | |

(Continued)

FOREIGN PATENT DOCUMENTS

JP    2001-309256 A    11/2001

OTHER PUBLICATIONS

U.S. Appl. No. 13/587,222, filed Aug. 16, 2012, Young et al.

(Continued)

*Primary Examiner* — Randy Flynn
(74) *Attorney, Agent, or Firm* — Wolf, Greenfield & Sacks, P.C.

(57) ABSTRACT

Methods and apparatus for providing a search interface for an electronic device including a tuner configured to tune the electronic device to receive scheduled programming content. A search query is received and one or more data sources including information about media content are searched based, at least in part, on the search query. The results of the search are presented on a user interface using a time-based axis and a time-independent axis.

20 Claims, 7 Drawing Sheets

(56) References Cited

U.S. PATENT DOCUMENTS

| | | |
|---|---|---|
| 8,301,457 B2 | 10/2012 | Yoon et al. |
| 8,358,749 B2 * | 1/2013 | Chang et al. ................. 725/110 |
| 8,607,276 B2 | 12/2013 | Chang et al. |
| 8,650,036 B2 | 2/2014 | Han et al. |
| 8,762,156 B2 | 6/2014 | Chen |
| 8,799,959 B2 | 8/2014 | Young et al. |
| 9,026,448 B2 | 5/2015 | Koivuniemi et al. |
| 9,031,848 B2 | 5/2015 | Cheong et al. |
| 9,066,150 B2 | 6/2015 | Young et al. |
| 9,106,957 B2 | 8/2015 | Koivuniemi et al. |
| 2002/0120455 A1 | 8/2002 | Nakata |
| 2002/0184195 A1 | 12/2002 | Qian |
| 2004/0128137 A1 | 7/2004 | Bush et al. |
| 2004/0264789 A1 | 12/2004 | Akiyama et al. |
| 2005/0149332 A1 | 7/2005 | Kuzunuki et al. |
| 2005/0172319 A1 * | 8/2005 | Reichardt et al. .............. 725/52 |
| 2006/0075429 A1 * | 4/2006 | Istvan et al. .................... 725/39 |
| 2006/0212433 A1 | 9/2006 | Stachowiak et al. |
| 2007/0088556 A1 | 4/2007 | Andrew |
| 2007/0107019 A1 | 5/2007 | Romano et al. |
| 2007/0118514 A1 | 5/2007 | Mariappan |
| 2007/0192310 A1 | 8/2007 | Takagi et al. |
| 2007/0203942 A1 | 8/2007 | Hua et al. |
| 2008/0043943 A1 | 2/2008 | Sipher et al. |
| 2008/0120665 A1 * | 5/2008 | Relyea et al. ................ 725/110 |
| 2008/0122796 A1 | 5/2008 | Jobs et al. |
| 2008/0288461 A1 | 11/2008 | Glennon et al. |
| 2008/0307463 A1 * | 12/2008 | Beetcher et al. ............... 725/53 |
| 2009/0112592 A1 * | 4/2009 | Candelore ....................... 725/44 |
| 2010/0115557 A1 | 5/2010 | Billmaier et al. |
| 2010/0131978 A1 * | 5/2010 | Friedlander et al. ........... 725/37 |
| 2010/0199219 A1 | 8/2010 | Poniatowski et al. |
| 2010/0251304 A1 | 9/2010 | Donoghue et al. |
| 2011/0060592 A1 * | 3/2011 | Kang et al. ................... 725/109 |
| 2011/0078731 A1 * | 3/2011 | Nishimura ..................... 725/39 |
| 2011/0099157 A1 | 4/2011 | Lebeau et al. |
| 2011/0106842 A1 | 5/2011 | Nishizawa et al. |
| 2011/0123004 A1 | 5/2011 | Chang et al. |
| 2011/0138331 A1 | 6/2011 | Pugsley et al. |
| 2011/0270615 A1 | 11/2011 | Jordan et al. |
| 2011/0283304 A1 * | 11/2011 | Roberts et al. ................. 725/53 |
| 2011/0289530 A1 | 11/2011 | Dureau et al. |
| 2011/0301955 A1 * | 12/2011 | Byrne ..................... G10L 15/22 704/251 |
| 2012/0066732 A1 | 3/2012 | Devericks et al. |
| 2012/0079529 A1 * | 3/2012 | Harris et al. ................... 725/32 |
| 2012/0233640 A1 * | 9/2012 | Odryna et al. ................. 725/45 |
| 2012/0304231 A1 * | 11/2012 | Anderson et al. .............. 725/53 |
| 2013/0061268 A1 | 3/2013 | Rothschild |
| 2013/0097623 A1 | 4/2013 | Lai et al. |
| 2013/0104172 A1 | 4/2013 | Lee et al. |
| 2014/0052450 A1 | 2/2014 | Cheong et al. |
| 2014/0052451 A1 | 2/2014 | Cheong et al. |
| 2014/0052452 A1 | 2/2014 | Koivuniemi et al. |
| 2014/0052453 A1 | 2/2014 | Koivuniemi et al. |
| 2014/0053209 A1 | 2/2014 | Young et al. |
| 2014/0373073 A1 | 12/2014 | Young et al. |

OTHER PUBLICATIONS

U.S. Appl. No. 13/587,260, filed Aug. 16, 2012, Cheong et al.
U.S. Appl. No. 13/587,280, filed Aug. 16, 2012, Cheong et al.
U.S. Appl. No. 13/587,300, filed Aug. 16, 2012, Koivuniemi et al.
U.S. Appl. No. 13/587,353, filed Aug. 16, 2012, Koivuniemi et al.
PCT/US2013/0555259, Oct. 29, 2013, International Search Report and Written Opinion.
International Search Report and Written Opinion for PCT/US2013/055259 mailed Oct. 29, 2013.
International Preliminary Report on Patentability for PCT/US2013/055259 mailed Feb. 26, 2015.

* cited by examiner

USER INTERFACE FOR ENTERTAINMENT SYSTEMS

BACKGROUND

Some electronic devices that can be used to access entertainment content (e.g., audio and/or video content) include, or are connected to, a tuner that enables the electronic device to receive and display scheduled programming content such as a television, radio, or other media program. To select a particular program for viewing on the electronic device, a user typically uses a remote control device to input the number of a channel associated with, e.g., broadcasting, the particular program. Some tunable electronic devices also allow a user to use a remote control device to search for and select content using an electronic programming guide (EPG), which is a user interface that displays scheduling information for current and future scheduled programming content in a time-based grid format. A user typically navigates through scheduled programming content entries displayed in an EPG by pressing buttons on the remote control device using a five-way navigational command system (left, right, up, down, and select). Once a user has highlighted a particular program on the EPG, the corresponding content may be shown on the electronic device by pressing the select button on the remote control device, after which the electronic device is tuned to the selected channel.

SUMMARY

One embodiment is directed to a method of presenting search results on an electronic device, wherein the electronic device includes a tuner configured to tune the electronic device to receive scheduled programming. The method comprises receiving a search query; searching, with at least one processor, at least one data source based, at least in part, on the search query; and presenting results of the search using a time-based axis and a time-independent axis.

Another embodiment is directed to an electronic device, comprising: a tuner configured to tune the electronic device to receive scheduled programming; and at least one processor programmed to: receive a search query; search at least one data source based, at least in part, on the search query; and present results of the search using a time-based axis and a time-independent axis.

Another embodiment is directed to a computer-readable storage medium encoded with a plurality of instructions that, when executed by at least one computer, perform a method, comprising: receiving a search query; searching at least one data source based, at least in part, on the search query; and presenting results of the search using a time-based axis and a time-independent axis.

Another embodiment is directed to a method of presenting search results on a visual user interface for a digitally-tunable electronic device configured to display scheduled programming content, the method comprising: receiving a search query; searching based, at least in part, on the search query, at least one scheduled programming content data source and at least one bundled service content data source; and presenting results of the search on the user interface, wherein the results of the search combine at least one first result corresponding to scheduled programming content and at least one second result corresponding to bundled service content.

Another embodiment is directed to an electronic device configured to display scheduled programming content, the electronic device comprising at least one processor programmed to: receive a search query; search based, at least in part, on the search query, at least one scheduled programming content data source and at least one bundled service content data source; and present results of the search on a user interface, wherein the results of the search combine at least one first result corresponding to scheduled programming content and at least one second result corresponding to bundled service content.

Another embodiment is directed to a computer-readable storage medium encoded with a plurality of instructions that, when executed by at least one computer, perform a method, comprising: receiving a search query; searching based, at least in part, on the search query, at least one scheduled programming content data source and at least one bundled service content data source; and presenting results of the search on a user interface, wherein the results of the search combine at least one first result corresponding to scheduled programming content and at least one second result corresponding to bundled service content.

Another embodiment is directed to a method of providing a user interface for a digitally-tunable electronic device configured to display scheduled programming content, the method comprising: displaying, on the user interface, a plurality of content-independent tags, the plurality of content-independent tags comprising a first content-independent tag identifying a first content unit returned from a search; and in response to receiving first input corresponding to the first content-independent tag, performing at least one action related to the first content unit.

Another embodiment is directed to an electronic device comprising at least one processor programmed to: display, on a user interface presented on the electronic device, a plurality of content-independent tags, the plurality of content-independent tags comprising a first content-independent tag identifying a first content unit returned from a search; and in response to receiving first input corresponding to the first content-independent tag, perform at least one action related to the first content unit.

Another embodiment is directed to a computer-readable storage medium encoded with a plurality of instructions that, when executed by at least one computer, perform a method, comprising: displaying, on a user interface, a plurality of content-independent tags, the plurality of content-independent tags comprising a first content-independent tag identifying a first content unit returned from a search; and in response to receiving first input corresponding to the first content-independent tag, performing at least one action related to the first content unit.

Another embodiment is directed to a digitally-tunable electronic device comprising: at least one processor programmed to: provide a user interface that enables the electronic device to receive a search query regardless of which of a plurality of screens is displayed on the user interface when the search query is received.

Another embodiment is directed to a computer-implemented method comprising: providing a user interface that enables an electronic device to receive a search query regardless of which of a plurality of screens is displayed on the user interface when the search query is received.

Another embodiment is directed to a computer-readable storage medium encoded with a plurality of instructions that, when executed by at least one computer, perform a method, comprising: providing a user interface that enables an electronic device to receive a search query regardless of which of a plurality of screens is displayed on the user interface when the search query is received.

Another embodiment is directed to a digitally-tunable electronic device comprising: at least one processor programmed to: receive first input; entering a listening mode in response to recognizing the first input; determine whether second input is received during a particular amount of time while the electronic device is in the listening mode; and exit the listening mode in response to determining that second input is not received during the particular amount of time.

Another embodiment is directed to a computer-implemented method comprising: receiving first input; causing an electronic device to enter a listening mode in response to recognizing the first input; determining whether second input is received during a particular amount of time while the electronic device is in the listening mode; and exiting the listening mode in response to determining that second input is not received during the particular amount of time.

Another embodiment is directed to a computer-readable storage medium encoded with a plurality of instructions that, when executed by at least one computer, perform a method, comprising: receiving first input; causing an electronic device to enter a listening mode in response to recognizing the first input; determining whether second input is received during a particular amount of time while the electronic device is in the listening mode; and exiting the listening mode in response to determining that second input is not received during the particular amount of time.

Another embodiment is directed to a method of searching for content to display on a digitally-tunable electronic device configured to display scheduled programming content, the method comprising: receiving a search query from a user; determining, based on the search query, an action the user wants to perform; determining one or more data sources to search based, at least in part, on the action the user wants to perform; and searching based, at least in part, on the search query, the one or more data sources for the content to display on the electronic device.

Another embodiment is directed to an electronic device comprising at least one processor programmed to: receive a search query from a user; determine, based on the search query, an action the user wants to perform; determine one or more data sources to search based, at least in part, on the action the user wants to perform; and search based, at least in part, on the search query, the one or more data sources for the content to display on the electronic device.

Another embodiment is directed to a computer-readable storage medium encoded with a plurality of instructions that, when executed by at least one computer, perform a method, comprising: receiving a search query from a user; determining, based on the search query, an action the user wants to perform; determining one or more data sources to search based, at least in part, on the action the user wants to perform; and searching based, at least in part, on the search query, the one or more data sources for the content to display on the electronic device.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that searching for content to view on an electronic device that includes a tuner for displaying scheduled programming content may be improved. Electronic program guides (EPGs) of the type discussed above are frequently used to search for and select scheduled programming content to view on a tunable electronic device, and are configured using a grid-like display format corresponding to the times when the scheduled programming content is available for viewing. The grid format of an EPG display is designed to receive input from a remote control device using a five-way navigation command system to move a cursor to different entries in the grid. The inventors have recognized that navigation using conventional EPG displays is cumbersome. To navigate through entries in a conventional grid-like EPG display using a five-way navigation command system, a user may be required to provide a series of navigation commands (e.g., "down-down-down-right-select"), which does not result in an efficient or intuitive experience for the user to select a particular program.

The inventors have recognized that the display of conventional EPG search systems is a "visual-first" user interface in which the main focus of the interface is to display the scheduled programming content in visually consistent boxes. The inventors have appreciated that other techniques for searching for content are possible that do not require a rigid visual presentation of scheduled programming content because the user is not restricted to navigating displayed entries using a five-way navigation command system. To this end, some embodiments of the invention are directed to methods and apparatus for an improved visual search interface. In particular, in some embodiments of the invention, the visual user interface is designed to encourage "natural-language first" input such that the interface is configured to encourage users to speak or otherwise provide input to the search system in a natural way.

Some embodiments encourage the use of voice input as a primary input modality, with visual aspects of the user interface being complimentary to voice input. However, it should be appreciated that any input that can be spoken can alternatively be provided via another type of input modality (e.g., text entry in a keyboard). Thus, while illustrated embodiments described below describe the use of voice as the input modality, other modalities can be used to allow the user to provide the same types of inputs described in the illustrated embodiments below as being provided by voice.

Figure 1:
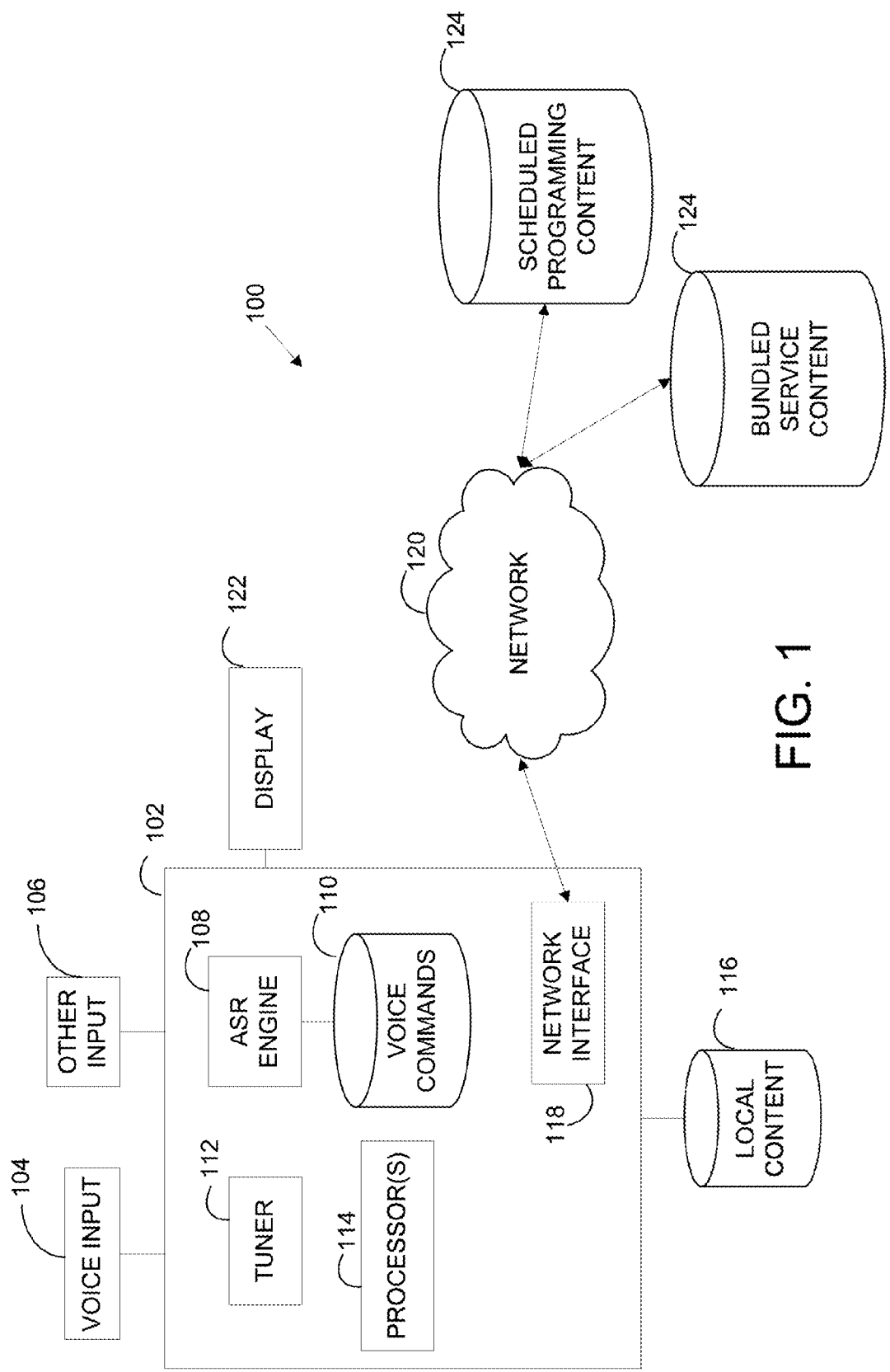
FIG. 1 is an exemplary system including components of some embodiments of the invention that relate to a search interface for entertainment systems.

An exemplary system 100 for use in accordance with some embodiments of the invention is illustrated in FIG. 1. System 100 includes electronic device 102, which may be a television, a computer, a portable electronic device such as a smartphone, or any other tunable electronic device configured to receive and display scheduled programming content. Electronic device 102 may be configured to receive input from a user to search for and select content to view on the electronic device, wherein the input is received using one or more input modalities. In some embodiments, electronic device 102 includes a voice input interface 104, such as a microphone and one or more other input interfaces 106 configured to receive the input. Other input interface(s) 106 may include, but are not limited to, a keyboard interface (e.g., a QWERTY keyboard), a mouse interface, a remote control interface, or any other suitable interface that enables a user to search for content to view on electronic device 102.

Voice input received via voice input interface 104 may be sent to automatic speech recognition (ASR) engine 108 for speech recognition to recognize the content of the received voice input. Although ASR engine 108 is illustrated in FIG. 1 as being included as a portion of electronic device 102, ASR engine 108 may alternatively be located remotely from electronic device 102 and may be in communication with electronic device 102 using any suitable communication mediums (e.g., one or more networks). In some embodiments, electronic device 102 may be associated with one or more local ASR engines 108 and one or more remotely located ASR engines, whereby at least some received voice input is processed by the one or more local ASR engine(s) and at least some received voice input is processed by the one or more remotely-located ASR engines. Examples of such distributed ASR systems are known by those of skill in the art. Voice input sent to the one or more remote ASR engine(s) for recognition using one or more communication medium(s) (e.g., one or more networks) connecting the electronic device 102 and the ASR engine(s) may be returned to the electronic device 102 from the remotely-located ASR engine(s) using the same or different communication medium(s).

In some embodiments, ASR engine 108 may be in communication with one or more voice command data sources 110 storing one or more voice commands. ASR engine 108 may match received voice input to the one or more voice commands stored in one or more voice command data sources 110 and return one or more matching voice commands to one or more processors 114 programmed to execute at least one action corresponding to the one or more matching voice commands. In some embodiments, electronic device 102 may be configured to interpret voice input as a voice command in response to activation of an input signal (e.g., the user pressing a key on a remote control or a keyboard) or in response to receiving voice input corresponding to a "wake-up" word that when received indicates that the voice input following the input signal should be interpreted as a voice command. Alternatively, voice input may be interpreted as a command without command initiation via an input signal (e.g., a key press or a wake-up word), as embodiments of the invention are not limited in this respect.

The set of voice commands stored by the one or more voice command data sources 110 may include any suitable commands for searching for and selecting content to view on the electronic device 102. In some embodiments, the set of voice commands may include commands to control functions of the electronic device 102 itself, examples of which include commands frequently found on a conventional remote control device, such as "mute," "power on," and "volume." An illustrative set of electronic device commands for controlling an electronic device 102 is shown below in Table 1, but it should be appreciated that these commands are provided merely as examples and that embodiments described herein are not limited to using these specific commands.

TABLE 1

Illustrative Electronic Device Commands

| Voice Command | Example(s) | Description |
| --- | --- | --- |
| Dragon | 'Dragon' | Wake-up-word will start speech recording or when device is on standby, will start device |
| Mute (on/off), mute, unmute | 'Mute on,' 'Unmute' | Mutes/unmutes volume |
| Shutdown, standby, (switch/turn/power) off | 'Shutdown,' 'Power off,' 'Turn off' | Sets device to standby mode |
| Volume <num_upto_100>, Set volume to <num_upto_100> | 'Set volume to 50,' 'Volume 70' | Sets the device volume from 0-100 |
| Volume (up/down) | 'Volume up' | Set volume up/down |
| Turn it (up/down), louder, softer | 'Turn it up,' 'Louder' | Set volume up/down |
| (Enable/start/disable/stop) (read out/screen reader), (Read out/screen reader) (on/off) | 'Enable read out,' 'Read out off,' 'Enable screen reader,' 'Screen reader on' | Turn on/off text-to-speech (TTS) |
| Exit, close | 'Exit,' 'Close' | Exit the current screen/window |
| Cancel | 'Cancel' | Cancel a request |
| Help/What can I say | 'Help,' 'What can I say?' | Show help |

The set of voice commands may also include tuner commands used to search for and/or select scheduled programming content to display on electronic device 102, such as "show <channel name>," "next channel," and "show <program name>." An illustrative set of tuner commands is shown below in Table 2, but it should be appreciated that these commands are provided merely as examples and that embodiments described herein are not limited to using these specific commands.

TABLE 2

Illustrative Tuner Commands

| Voice Command | Example(s) | Description |
|---|---|---|
| channel (up/down) | 'channel up' | Switch to next/previous channel in channel list |
| next channel | 'next channel' | Switch to next channel |
| previous channel | 'previous channel' | Switch to previous channel |
| [show] channel <number> | 'show channel 5' | Switch to specified channel |
| switch to channel <number> | 'switch to channel 5' | Switch to specified channel |
| [show] channel <channel name> | 'show channel HBO' | Switch to specified channel name |
| show <channel name> | 'show HBO' | Switch to specified channel name |
| switch to <channel name> | 'switch to HBO' | Switch to specified channel name |
| show listings | 'show listings' | Show electronic program guide |
| show EPG | 'show EPG' | Show electronic program guide |
| show [the] [program] guide | 'show program guide' | Show electronic program guide |
| show channels | 'show channels' | Show channels list |
| show channel list | 'show channel list' | Show channels list |
| what's on [<channel name>] [at <time>] | 'what's on HBO at 6' | List programs on channel at specified time |
| what's on channel <number> [at <time>] | 'what's on channel 5' | List programs on channel at specified time |
| what's on <channel name> <day> [at <time>] | 'what's on HBO on Monday,' 'what's on HBO tonight at 9,' what's on HBO tomorrow at 6 pm' | List programs on channel at specified time |
| what's on channel <number> <day> [at <time>] | 'what's on channel 5 on Monday morning' | List programs on channel at specified time |
| show <program name> | 'show Frasier' | Switch to channel that is currently playing program or has program in schedule within 30 minutes |
| what am I (looking at/ watching), [show] information | 'what am I watching,' 'show information,' 'information' | Shows current channel information |
| Find/Search <program/genre> [<actor>] [<channel>][<at time>] | 'find movies with Harrison Ford,' 'search for comedies tonight,' 'find news on PBS,' 'find action movies' | Advanced searching using program guide information |

The set of voice commands may also include application commands for interacting with one or more client applications on electronic device 102 that perform any of numerous functions, including providing access to numerous services. For example, a user may use an application command to initiate a voice call session using a client application that performs calling (such as Skype™), search for weather information, or perform any of numerous other actions. An illustrative set of application commands is shown below in Table 3.

TABLE 3

Illustrative Application Commands

| Voice Command | Example(s) | Description |
|---|---|---|
| Call [to] <contact name> | 'call to Stefan' | Initiates voice call to given contact name, contact name taken from contact list |
| [show/open] skype | 'show skype,' 'skype' | Open Skype ™ client |
| Answer | 'answer' | Answer incoming call |
| Decline | 'decline' | Reject incoming call |
| Cancel | 'cancel' | Cancel initiated call |
| Find/search/show/play <video> on video sharing service (e.g., YouTube) | 'show Michael Jackson on YouTube,' 'Find ice hockey goal on YouTube' | Start YouTube ™ client and use <video> part to search |
| [show/open] YouTube | 'show YouTube,' 'YouTube' | Open YouTube ™ client |

TABLE 3-continued

Illustrative Application Commands

| Voice Command | Example(s) | Description |
| --- | --- | --- |
| Find/search [for] <video> on YouTube | 'find Miami Vice' | Search videos on YouTube ™ (YouTube ™ client already open) |
| Play/show/watch [full screen] | 'play,' 'watch full screen' | Select video from results list and show it on small screen [or full screen]. If a video is already playing in small screen, open the full screen playback |
| Play/show/watch/select <title> [full screen] | 'play Rihanna Man Down' | Select a video to play from results list [open full screen playback] |
| Play/show/watch/select number <item number> [full screen] | 'play number 6 full screen' | Select a video to play from results list [open full screen playback] |
| Page up/previous page, page down/next page | 'page down,' 'previous page' | Switch to the next/previous page |
| [go to the] (first item/beginning) | 'first item' | Browse to the beginning of results list |
| [go the the] (last item/end) | 'go to the last item' | Browse to the end of results list |
| Back | 'back' | If video playback is on, go back to results list. If showing results list, close YouTube ™ client. |
| Find weather in <city> | 'find weather in Seattle' | Update weather information on toolbar |
| Search [for] weather in <city> | 'search weather in Las Vegas,' Search for weather in Stockholm' | Update weather information on toolbar |
| What's the weather in <city> | 'what's the weather in New York' | Update weather information on toolbar |
| Share on [the] Twitter | 'share on Twitter' | Open Twitter ™ client update window, start dictation automatically |
| Send to [the] Twitter | 'send to the Twitter' | Open Twitter ™ client update window, start dictation automatically |
| Update [the] Twitter | 'update Twitter' | Open Twitter ™ client update window, start dictation automatically |
| Open/show/go to Twitter | 'open Twitter' | Open Twitter ™ client update window |
| Close | 'close' | Cancel Twitter ™ update |
| Dictate | 'dictate' | Starts dictation within open Twitter ™ client application |
| Send | 'send' | Update Twitter ™ account with text shown on 'edit box' |
| Close | 'close' | Close Twitter ™ client and cancel update |

The illustrative application commands described in Table 3 include commands to control exemplary client applications including Twitter™, YouTube™, and Skype™. However, it should be appreciated that embodiments of the invention may include voice commands for any other client application and are not limited in this respect. For example, voice commands for client applications including, but not limited to, Facebook®, Gmail™, NetFlix®, Hulu™, and MySpace™ may also be included. Some client applications, including many of those listed above, may be web-based services or applications that can be accessed either via a specialized application on the electronic device or via a web browser on the device and embodiments of the invention are not limited in the way in which a client application is accessed.

The set of voice commands may also include action commands, each for performing an action related to one or more items in a search results list. An illustrative list of action commands is described below in Table 4.

TABLE 4

Illustrative Action Commands

| Voice Command | Example(s) | Description |
| --- | --- | --- |
| Select <item name>, [Select] number <item number> | 'Select How I Met Your Mother,' Number one' | Show options for a search result. See the next table for commands in a results options dialog |

TABLE 4-continued

Illustrative Action Commands

| Voice Command | Example(s) | Description |
| --- | --- | --- |
| (play/show/watch) <item name>, (play/show/watch) <number <item number> | 'show Frasier,' 'play number two' | Change the channel to the one that has the selected program in the program guide |
| (dvr/record) <item name>, (dvr/record) number <item number> | 'record How I Met Your Mother,' 'DVR number three' | Display 'recording set' notification for the program |
| Page up/previous page, page down/next page | 'page down,' 'previous page' | Switch to the next/previous results page |
| [go to the] (first item/beginning) | 'first item' | Browse to the beginning of the results list |
| [go to the] (last item/end) | 'go to the last item' | Browse to the end of the results list |
| Watch | 'watch' | Change the channel and starts playing the selected program |
| DVR | 'DVR' | Display 'recording set' notification' |
| Cancel | 'cancel' | Cancel a selection |

In some embodiments, the set of voice commands may also include EPG commands for interacting with an EPG display. Rather than restricting the user's navigation through EPG entries using a conventional five-way navigation command system used with remote control devices, the set of EPG commands may provide additional voice functionality to enhance the user's browsing experience. An illustrative set of EPG commands is described below in Table 5.

TABLE 5

Illustrative EPG Commands

| Voice Command | Example(s) | Description |
| --- | --- | --- |
| Select [program] <program name> | 'select How I Met Your Mother' | Show options for a program |
| (play/show/watch) <program name> | 'show Ice Age' | Change the channel to the one that has the selected program running. Show options if the program has not yet started |
| (dvr/record) <program name> | 'record How I Met Your Mother' | Display 'recording set' notification for the program |
| (select/play/show/watch) <channel name> | 'show HBO' | Change to channel visible in EPG |
| [select/play/show/watch] channel [number] <channel number> | 'show channel 11,' channel number 6' | Change to channel visible in EPG |
| Page up/previous page, page down/next page, page left, page right | 'previous page,' 'page up,' 'page left,' 'page right' | Switch to another page in the EPG view |
| Previous channel/step up, next channel/step down | 'next channel,' 'previous channel' | Step up/down in the channel list |
| [go to the] (first item/beginning) | 'first item' | Browse to the beginning of the channels list |
| [go to the] (last item/end) | 'go to the last item' | Browse to the end of the channels list |

In some embodiments, electronic device 102 also includes a tuner 112 configured to enable electronic device 102 to tune to a particular channel to display scheduled programming content on electronic device 102. For example, tuner 112 may enable the electronic device to receive scheduled programming content from one or more scheduled programming content sources 124 connected to electronic device 102 via network 120. Scheduled programming content sources 124 may source media content scheduled for these times including, but not limited to, stored content (e.g., television programs, and movies), and live media content. Scheduled programming content sources 124 that store and/or transmit scheduled programming content to an electronic device (e.g., over a communication medium such as a cable or satellite network) is well-known. Some embodiments may include a tuner configured to receive scheduled programming content from multiple content sources and/or may include multiple tuners, each of which is configured to receive scheduled programming content from a different content source.

Electronic device 102 may also include network interface 118 configured to communicate with one or more storage and/or processing devices via one or more network 120. As discussed above, network interface 118 may be used to transmit voice input to one or more remote ASR engines and receive speech recognition results from the one or more ASR engines. Electronic device 102 can employ a single network interface 118, or more than one network interface 118 to enable the electronic device 102 to connect to more than one type of network (e.g., to perform different functions).

An exemplary electronic device 102 is a television system. Television systems often include a tuner to enable the television system to display scheduled programming content received by a set top box that is connected to the television. A set top box is an example of a tuner 112, which receives scheduled programming content via a network interface 118 and decodes the received content to enable the electronic device to display the content on a display 122. Scheduled programming content or any other content received via network 120 may be displayed on the display 122 connected to electronic device 102. In some embodiments, display 122 may be integrated as part of electronic device 102 and in other embodiments, display 122 may be connected to electronic device 102 via one or more wired or wireless connections. Display 122 can also be a single display or multiple displays and embodiments of the invention are not limited in this respect.

In some embodiments, electronic device 102 may also be associated with a local content data source 116, which may be configured to store one or more television programs, one or more movies, or any other content suitable for playback on the electronic device. For example, in some embodiments, local content data source 116 may be a digital video recorder (DVR) configured to store recorded scheduled programming content. Local content data source 116 may be configured to store content related to one or more local client applications associated with electronic device 102 including, but not limited to, one or more applications that store and/or manage picture files, music files, and/or video files.

In accordance with some embodiments, when searching for content to view and/or playback on electronic device 102, content may be retrieved from local content data source 116 and/or one or more data sources (e.g., scheduled content data source 124, bundled service content data source 124) remotely located from electronic device 102 and connected to electronic device 102 by network 120. The particular source(s) that are searched may depend, at least in part, on the search query. When results are returned from multiple sources, the search results may be ordered based, at least in part, on the source of the content corresponding to the search results. In some embodiments, a user may be able to restrict a search for content based on the source of the content and/or the type of content desired to be included in the search results, as described in more detail below.

Some embodiments are directed to a voice-controllable visual search interface displayed on display 122 and configured to allow the user to search for content to view and/or playback using the electronic device 102. The user may be able to interact with the search interface to search for scheduled programming content, as described above. Scheduled programming content includes, but is not limited to, broadcast content such as television and radio programs.

Additionally, some embodiments may enable a user to search for bundled service content stored, for example, by one or more network-connected bundled service data sources 124 and/or local content data source 116. Unlike scheduled programming content which may only be available for viewing at particular times (e.g., when the content is scheduled for broadcast), bundled service content may be available for viewing/playback at any time. Bundled service content may include, but is not limited to, content from a web-based service (e.g., Netflix®), content from a local or remote data source storing media content (e.g., DVR content, on-demand content from a service provider, etc.), and content associated with one or more client applications (e.g., iTunes®) associated with electronic device 102. As described in more detail below, searching for content in accordance with some embodiments may allow a user to search for scheduled programming content, bundled service content, or both scheduled programming content and bundled service content in a single search.

Figure 2:
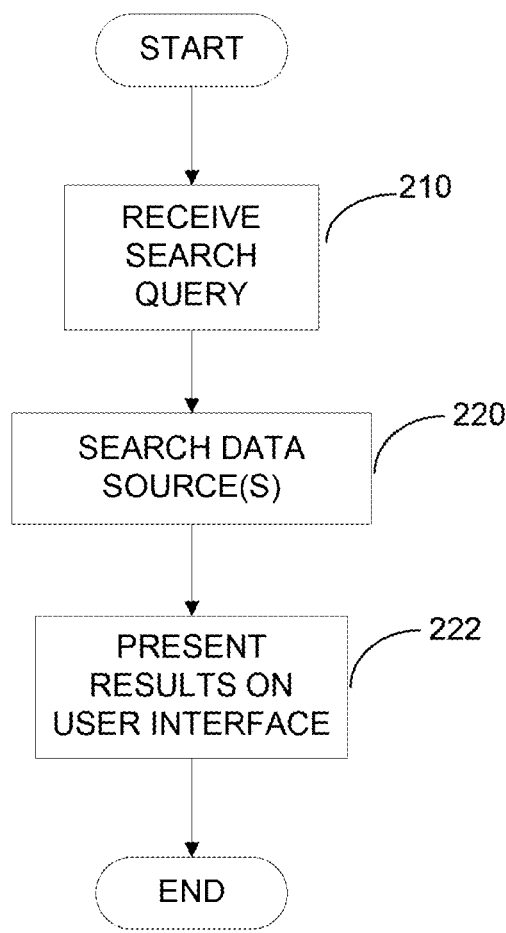
FIG. 2 is a process for presenting results of a query for content on a user interface in accordance with some embodiments of the invention.

An exemplary method for processing a search query in accordance with some embodiments of the invention is illustrated in FIG. 2. In act 210, electronic device 102 receives a search query to search for content to view and/or playback on electronic device 102. For example, the search query may include one or more voice commands, as discussed above. To interpret received voice input as one or more voice commands, the voice input may be processed by one or more local and/or remote ASR engines for recognition. In some embodiments, a determination of whether to process voice input via a local and/or remote ASR engine may be made based, at least in part, on the type of voice input. For example, in one implementation, voice input corresponding to fixed-form device commands (e.g., "mute," "power off," "volume up") may be processed by a local ASR engine, whereas commands including free-form input (e.g., 'Search,' 'Find,' etc.) may be processed by one or more remotely-located (e.g., "cloud") ASR engines. For example, since fixed-form commands may be associated with a limited grammar, they can be easier to recognize and a local ASR engine may suffice for voice recognition and be faster than sending the input to a remote ASR engine. However, free-form input may be more difficult to recognize, so sending the input to more robust ASR engine(s) may be required for acceptable recognition performance. Also, language models associated with remotely ASR engines can be updated regularly to reflect changes in popular culture, names of movies, actors, books, etc. that might otherwise be difficult for a local ASR engine to recognize. In some embodiments, at least a first portion of the voice input may be processed by a local ASR engine and at least a second portion of the voice input may be processed by a remotely-located ASR engine, and any combination of local and remote ASR engines may be used to recognize received voice input.

The process then proceeds to act 220, where one or more data sources are searched based, at least in part, on the recognized voice input corresponding to the search query. The one or more data sources may be searched in any order, and any particular data source(s) (including less than all of the available data sources) may be searched. The results that are returned from the search may be determined in any suitable way. In some embodiments, a determination of which data sources to search may be made based, at least in part, on a particular action a user wants to perform. For example, if the user says "listen Bob Seger," the system may determine that the user wants to listen to music, so only a local music data source may be searched and not a data source associated with an EPG. Alternatively, if the user says "watch Modern Family," it may be determined that the user wants to watch a television show. Accordingly, a data source associated with an EPG and one or more data sources associated with recorded television content may be searched, but a local music data source may not be searched. By selectively searching less than all available data sources, some embodiments of the invention may return relevant search results in a more efficient manner by reducing an amount of time to return the search results. However, not all embodiments are limited to searching only a subset of available sources as all available sources may be searched for some searches.

In some embodiments, an order in which the data sources are searched and/or an order in which the search results are presented may be determined based, at least in part, on one or more rules associating a particular command (or determined user intent) with a particular order for searching and/or presenting search results. For example, if a user says "watch Modern Family," recognition of the voice command "watch" (or an intended action if a specific command is not employed, as discussed below) may cause the electronic device to search and return results from data source(s) associated with an EPG first, search and return results from data source(s) associated with local content second, and search and return results from data source(s) associated with client applications (e.g., YouTube™) third. It should be appreciated that this particular order for searching and returning search results associated with a "watch" command is described merely for illustrative purposes and any other desired order may alternatively be used.

Additionally, some embodiments may not include a fixed command grammar, but rather may determine a user's intent from the received input in some other way, such as determining a user's intent by monitoring for particular words in free-form input, and performing an action in response to determining the user's intent. For example, if a user uses the "play" command or uses the term "play" in a free-form input, the system may recognize that the play command or use of the word "play" may suggest an intent by the user to access always accessible content, whether locally stored or available on-demand. One or more priority rules may be used to determine what media content to play. For example, it may first be determined whether the EPG has any media content currently available to be played (e.g., broadcast content, on demand content, etc.) that matches the voice input. If it is determined that there is not currently available content from the EPG, it may next be determined whether any recorded media content (e.g., DVR content) matches the voice input. If more than one piece of recorded media content match the voice input, the one or more priority rules may specify that all the matching content be displayed so that the user may select among them. Alternatively, in some embodiments, rather than displaying a plurality of search results to a user, the electronic device may automatically playback a selected one of the matching content (e.g., the oldest unwatched (or partially watched) recorded content be selected and played back on the electronic device). Although the above-described example relates to playing media content using a particular set of priority rules, it should be appreciated that these rules are merely illustrative, and that any suitable set of priority rules may be used for any voice input as embodiments of the invention are not limited in this respect.

Returning to the process of FIG. 2, after the one or more data sources has been searched in act 220, the process proceeds to act 222, where one or more results are displayed on a user interface associated with electronic device 102 in response to searching the one or more data sources for content that matches the search query. The search result(s) may be displayed in any suitable way including using a voice-enabled search results interface, as described in more detail below. As discussed above, displaying the results can include directly presenting a piece of content that matches user input.

Figure 3:
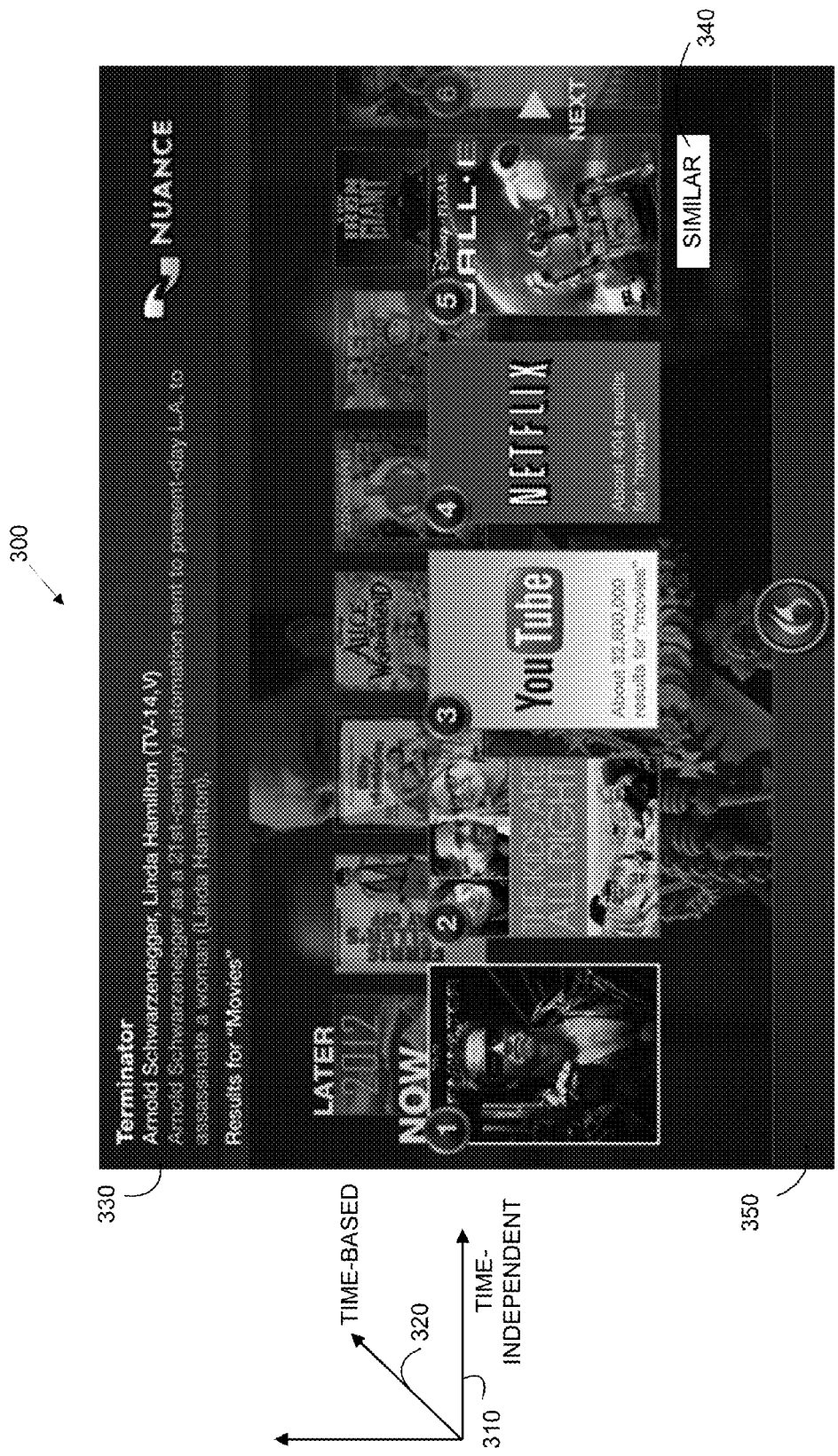
FIG. 3 is a schematic of a portion of a user interface for displaying results of a query for content in accordance with some embodiments of the invention.

FIG. 3 illustrates a portion of a visual search interface in accordance with some embodiments of the invention. In particular, FIG. 3 shows an illustrative result screen 300 for displaying search results returned from a user-initiated search for content to view and/or play on an electronic device. In some embodiments, result screen 300 is configured to display search results along at least two axes. In one illustrative embodiment, one axis is in the foreground of the search interface and one or more other axes are in the background of the search interface, but can be brought to the foreground of the search interface in response to a command (e.g., a voice command). In yet some other embodiments, only the content displayed on the axis in the foreground is fully focused, and other axes are partially out of focus to draw the user's attention to the foreground axis. However, not all embodiments using foreground and background axes are limited in this respect, as some embodiments can present two or more axes fully in focus.

In some embodiments, first axis for displaying search results may be a time-independent axis 310. Search results may be ordered along time-independent axis 310 using any suitable metric not related to a time when the content corresponding to the search results is available for viewing and/or playback. For example, in one non-limiting example, the search results may be ordered along the time-independent axis based, at least in part, on relevance to the search query that led to the result. In some embodiments, content displayed along the time-independent axis may be limited to content that is available at the current time, while in other embodiments it may include content not currently available. For embodiments that order the returned search results based on relevance to a search query, relevance may be determined in any suitable way using any suitable algorithm (e.g., including giving higher relevance to content currently available for viewing), as embodiments of the invention are not limited in this respect. It should be appreciated that relevance to a search query is only one way to order results along the time-independent axis, and that any other suitable metric may be used instead of or in addition to relevance to a search query. For example, the search results may be ordered based, at least in part, on type of content, source of content, or any other factor or combination of factors.

In some embodiments, search results may also be organized along a second axis that is time-based and is configured to display search results available for viewing at different times. For example, the foreground of the result screen 300 may display search results for content that is currently available, whereas content available only at a future time may be shown in the background 320 as illustrated in FIG. 3.

Although the result screen 300 includes search results displayed on only two axes it should be appreciated that search results may be displayed on any number of axes, as embodiments of the invention are not limited in this respect. For example, in some embodiments search results for bundled service content that are available at the current time, but may require a subscription or some other fee to be paid prior to viewing the content, may be displayed along a separate axis (not shown) to indicate that the content may be viewed only after an applicable payment has been paid.

Result screen 300 may also include description section 330 that includes information regarding a currently selected search result. Description section 330 may also include other information that enables the user to make an informed selection from the search results displayed on result screen 300. For example, description section 330 may include a description of the content associated with the currently selected search result, and this description may change based on a selection of a different search result displayed on result screen 300.

In some embodiments, less than all of the search results returned from the searching process may be displayed on result screen 300 to minimize crowding of the display. In some embodiments, a user may interact with one or more voice tags, described in more detail below, to view additional search results. Result screen 300 may also include discovery field 340 that enables a user to perform an additional search based on one or more of the search results displayed on result screen 300. For example, discovery field 340, when selected by a user, may initiate a search for content similar to content associated with the currently selected search result. Similarity may be determined in any suitable way using any suitable algorithm, as embodiments of the invention are not limited in this respect. For example, similarity may be determined based, at least in part, on a content source content was retrieved from, one or more content tags associated with a piece of content (e.g., parental ratings for movies), type of content, or any combination of these or other factors.

In some embodiments, result screen 300 may include a toolbar 350 including information to facilitate a user interaction with search screen 300. For example, toolbar 350 may include one or more icons, text, or other indicators explaining screen-specific or global inputs (e.g., voice commands) that a user may use to interact with result screen 300.

Figure 4:
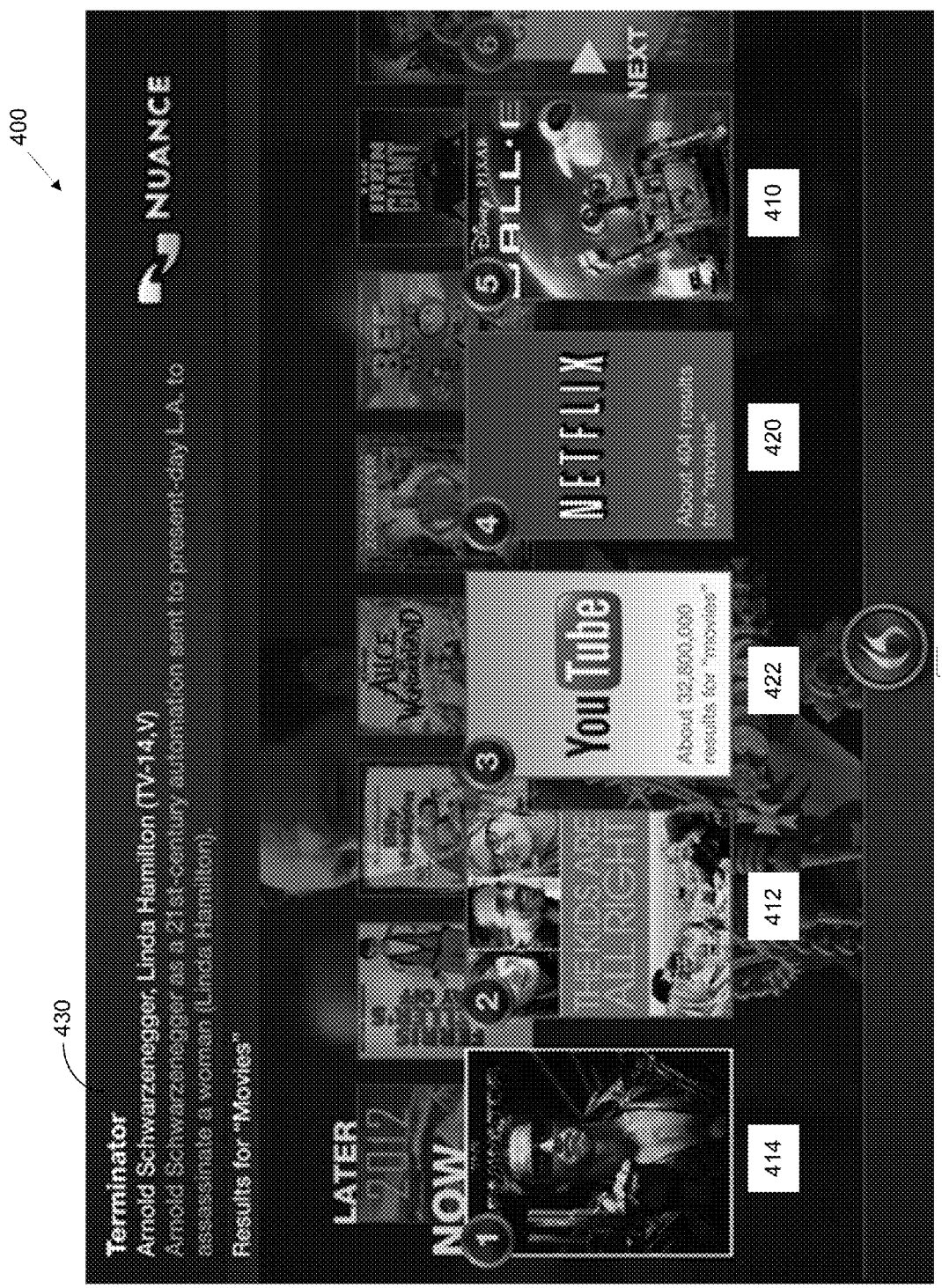
FIG. 4 is a schematic of a portion of a user interface for displaying blended results of a query for content in accordance with some embodiments of the invention.

Search results, in accordance with some embodiments of the invention, may comprise blended search results that include different types of content. For example, as discussed above, search results may include results corresponding to scheduled programming content and bundled service content. FIG. 4 illustrates an illustrative result screen 400 in which the search results displayed on the result screen 400 include blended search results, i.e., at least two of the search results are associated with different types of content. The blended search results may include first results returned from one or more scheduled programming content data sources and second results returned from one or more bundled service content data sources. The search results displayed on result screen 400 include search results 410, 412, and 414, which may be results returned from one or more scheduled programming content data sources and search results 420 and 422, which may be results returned form one or more bundled service content data sources.

As illustrated in FIG. 4, search results returned from scheduled programming content data sources and search results returned from bundled service content data sources may be mixed together and ordered along a time-independent axis using any suitable metric or combination of metrics including, but not limited to, relevancy to the search query, type of content, and source of content. As with result screen 300, result screen 400 may include a description portion 430 that includes information about one or more of the search results displayed on result screen 400.

In some embodiments, search results displayed on result screen 400 may be ordered along at least two axes including a time-independent axis and a time-based axis. In some embodiments, the search results displayed in a background portion of the search interface may include only scheduled programming content and not bundled service content. For example, because some bundled service content may always be available, in some embodiments search results corresponding to such bundled service content may always be shown in a foreground portion of the search interface to indicate that it is available for viewing and/or playing immediately. It should be appreciated, however, that this is merely one illustrative way to organize content using two axes and other organizations of content are also possible.

As discussed above, some bundled service content may only be accessed immediately upon payment of a fee. For example, a song from an online music store such as iTunes® may be accessed immediately, but only upon purchase of the song. In some embodiments, although not shown in FIG. 4, search results that correspond to content that requires payment before becoming available for viewing and/or playback on an electronic device may not be mixed with other search results, but may appear in a different portion of the search results interface.

Figure 5:
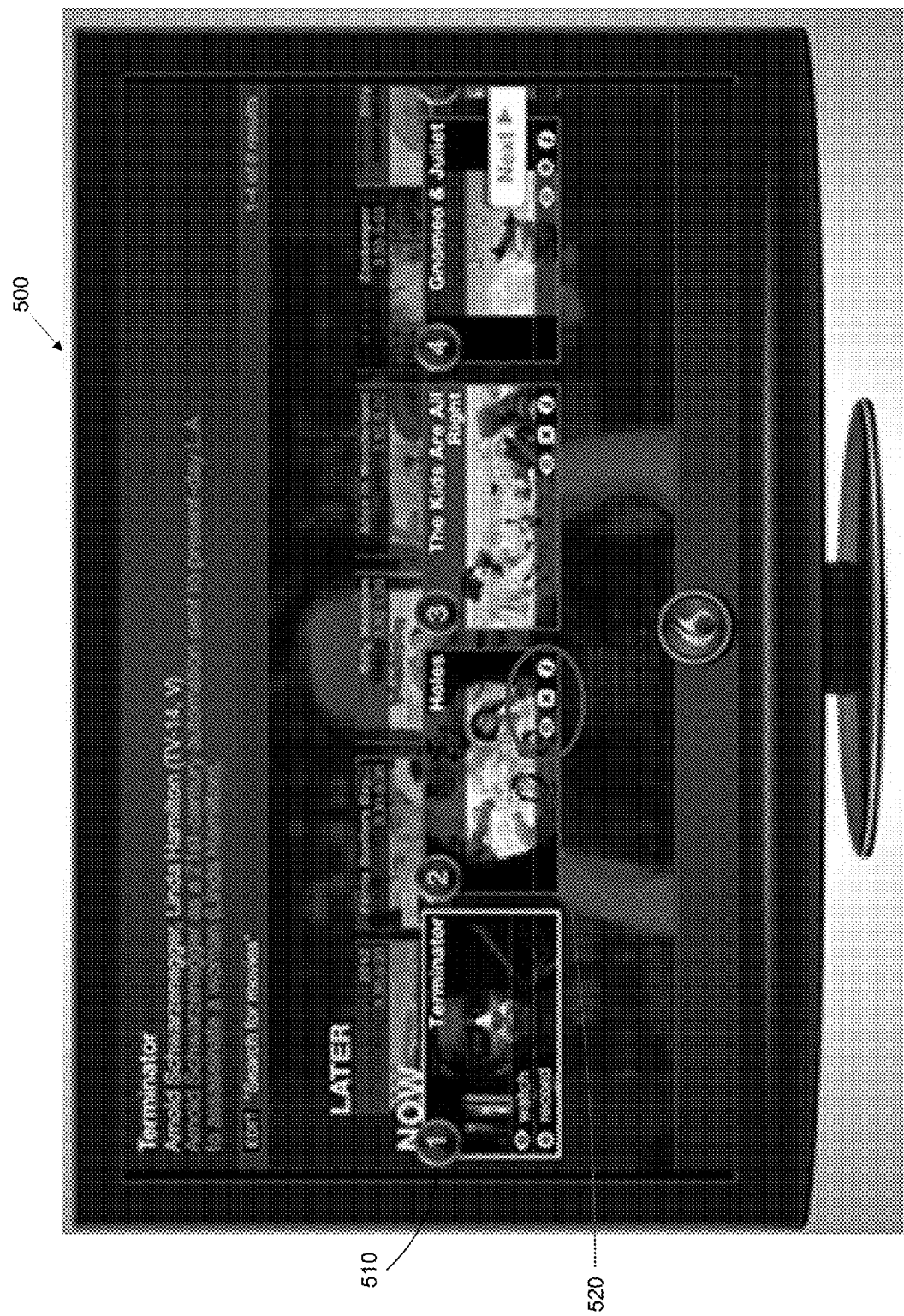
FIG. 5 is a schematic of portion of a user interface displaying voice tags a user may interact with using input in accordance with some embodiments of the invention.

In some embodiments, a search interface in accordance with some embodiments of the invention may include one or more selection tags that facilitate interactions between a user and one or more components of the search interface. FIG. 5 illustrates an exemplary result screen 500 including a plurality of selection tags. As illustrated in FIG. 5, one or more of the search results may be associated with a selection tag 510, which indicates input a user may provide (e.g., via spoken input, a keyboard or keypad, etc.) to select a particular search result. In the exemplary result screen 500, for embodiments employing a voice interface, if the user wanted to select the first search result in the lower left corner, the user may say "select 1." Alternatively, if the user wanted to select the search result displayed on the lower right corner, the user may say "select 4."

Result screen 500 may also include other types of selection tags such as one or more icons 520 that enable a user to use a selection command to perform one or more actions related to the content with which the icon is associated. For example, the icons 520 may include, but are not limited to, icons that indicate to the user that they may view particular content, record particular content, or perform some other action associated with the particular content associated with the icon. The user may combine an action with identification of a selection tag to perform the action on the selected content. For example, a user may view the content associated with the search result in the lower left corner of FIG. 5 by saying "view 1."

In some embodiments, that employ a voice interface, voice interactions with the visual search interface may be categorized into different types of voice commands depending on when the voice command is active. For example, some voice commands may be categorized as screen agnostic commands, which are independent of the content displayed on any particular screen and are always active irrespective of what particular screen is currently being presented on display. Some non-limiting examples of screen agnostic commands include, but art not limited to, commands such as volume control, channel control, screen brightness, and menu accessing commands. In some embodiments, the set of screen agnostic commands overlap substantially with functionality conventionally controlled by a remote control device. Screen agnostic commands may be associated with one or more labels for selective tags displayed on the search interface to alert the user to the presence of these commands, or in some embodiments the user is presumed to know that these always available commands and can be invoked so that no selection tags or icons are displayed. In some embodiments, icons for one or more of the global commands may be included in a toolbar displayed on the search interface screen and/or a list of global commands may be accessed in response to a trigger event such as asking for help, pressing a hotkey on an input device, or in some other way.

Some voice interactions may be associated with screen-dependent actions that enable a user to perform actions only within a particular screen of the user interface. For example, in the result screen 500 illustrated in FIG. 5, selection tags 510 may allow a user to select a particular search result as described above, and the response to selecting the particular search result, a description of the content associated with the selected search result may be updated on the search interface to provide the user with information that may help the user decide whether to perform an action (e.g., watch, purchase, record) on the content associated with the selected search result.

Other screen-dependent actions may be associated with one or more navigation functions of the search interface that enable a user to navigate within a particular result screen, and/or to update the content of a result screen. For example, the search interface may display a voice-enabled label that allows a user to view additional search results not currently displayed on the search interface, for example, by speaking "next results" or some other command phrase or free-form input to update the result screen to include the additional results.

The search interface may be further configured with user interaction functionality associated with screen-dependent actions to allow a user to switch between search results presented at different levels of a multi-axis display. For example, in embodiments in which search results are displayed along a time-independent axis and a time-based axis, the user may use voice (or other forms of) input to switch which results along the time-based axis are currently in focus and can be selected. For example, a user may say "later" (or some other word or phrase) to select content associated with search results displayed in the background of the user interface along the time-based axis of the displayed search results. This may be useful, for example, to allow the user to take an action (e.g., record) relating to scheduled programming content that is available at some later time. To perform this action, the user may say "later" (or some other word or phrase), which may switch the search results displayed in the foreground and the search results displayed in the background to enable the user to select an item for which content is available only in the future.

Another category of user interactions may be represented by graphical icons 520 that enable a user to perform a particular action such as recording, viewing, or playback of content associated with the search result. In some embodiments, graphical icons may also correspond to additional value-added actions that enable a user to perform other "secondary" functions such as posting to Facebook®, performing an action on Twitter™, or interacting with another client application service or website.

Although the illustrative examples above discuss three different types of user interactions, (i.e., screen-agnostic commands, screen-dependent actions, and graphical icon actions) it should be appreciated that any number of types of user interactions may be used, as embodiments of the invention are not limited in this respect.

In some embodiments, that support a voice interface, the presence or absence of selection tags and/or other icons displayed on a search interface may be determined based, at least in part, on whether voice interaction has been activated for the search interface. Determining whether voice interaction is active for the search interface may be performed in any suitable way including, for example, determining whether a microphone is active, determining whether voice recognition software is executing on the electronic device, determining whether a user has issued a voice command to display the voice tags on the search interface, or other suitable ways.

Figure 6:
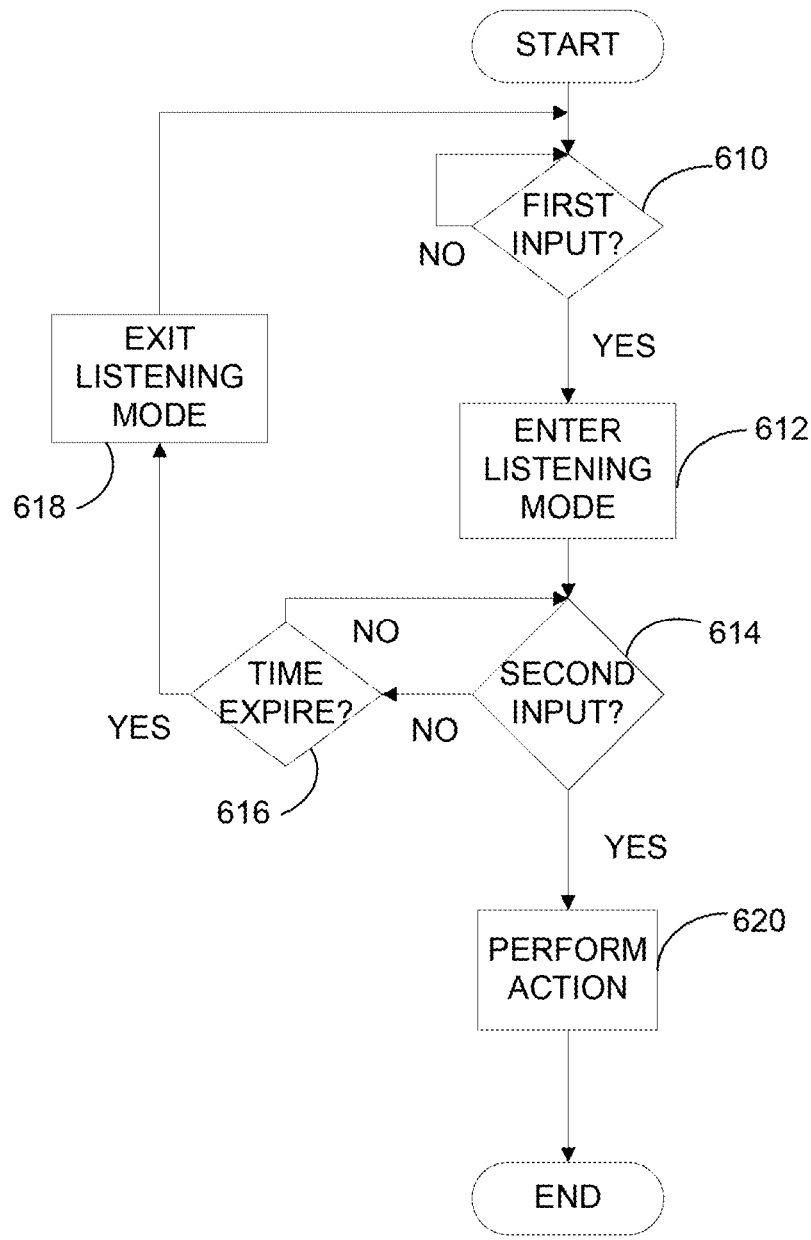
FIG. 6 is an exemplary process for monitoring for input using a listening mode in accordance with some embodiments of the invention.

In some embodiments, the electronic device may receive input which causes the electronic device to enter a "listening mode" during which the electronic device is expecting further input from the user to perform an action. In contrast, when the electronic device is not in listening mode, the electronic device may not interpret received input, by default, as representing a user's intent to perform a particular action, and may be monitoring for input to trigger entry into listening mode. An illustrative process for an electronic device that includes a listening mode in accordance with some embodiments of the invention is illustrated in FIG. 6. In act 610, it is determined whether a first input has been received that will cause the electronic device to enter a listening mode. For example, in embodiments that include a voice interface, the first input may correspond to a voice command or some other voice input demonstrating a user's intent to perform an action, as described above. Alternatively, the first input may be any other suitable input to cause the electronic device to enter listening mode including, but not limited to, a press of a particular key on a keyboard or keypad.

If it is determined in act 610 that a first input has not been received, the process continues to monitor for a received first input. Otherwise, if a first input has been received, the process proceeds to act 612, where the electronic device is caused to enter a listening mode in response to recognizing the first input. While in listening mode, the process proceeds to act 614, where it is determined whether a second input has been received. If it is determined that a second input has been received while in listening mode, the process proceeds to act 620 where one or more actions corresponding to the first and/or second input are performed. If it is determined in act 614 that a second input has not been received, the process proceeds to act 616 where it is determined whether a particular amount of time (e.g., 5 seconds) has elapsed since entering listening mode. If it is determined in act 616 that the particular amount of time has not yet elapsed, the process continues to monitor for a second input. Otherwise, if it is determined that the particular amount of time has elapsed, the process proceeds to act 618, where the electronic device is caused to exit listening mode, and the process returns to act 610 to monitor for a first input. In the above-described embodiment, the electronic device exits listening mode after a particular amount of time has passed after entering listening mode. However, it should be appreciated that in some embodiments, listening mode may alternatively be exited in other ways. For example, some embodiments may enable a user to explicitly exit listening mode by providing input instructing the electronic device to do so. This explicit input may take any suitable form including, but not limited to, a voice command (or determined user intent), or a key press on a keyboard or keypad.

In some embodiments, when an electronic device is caused to enter into a listening mode, this may be noted in some way on the user interface displayed by the electronic device. For example, upon entering the listening mode, one or more selection tags and/or icons may appear on the user interface to inform a user that listening mode has been entered. It should be appreciated that changes to a user interface to reflect the mode status of the electronic device may be performed in any way and the example of displaying or hiding selection tags and/or icons is only one way to indicate the status and other ways are also possible.

In some embodiments, bundled service content search results may be represented hierarchically. For example, if a particular bundled service includes one or more pieces of content that match a search query, they may initially be represented by including an identifier for the bundle service in the search results, but not the corresponding pieces it content themselves, and then selection of the bundled service from among the search results may cause the corresponding pieces of content to be shown on the user interface.

For example, an application associated with a bundled service content search result may be illustrated as an image or icon for the application, which is recognized by a user as representing that application. For example, the bundled service search result may correspond to a movie streaming service such as, Netflix® (e.g., illustrated by a Netflix® icon), and in response to selecting the movie streaming service by, for example, saying "select 2," which selects the second search result (e.g., the Netflix® search result), search results within the Netflix® application may be displayed.

In an illustrative example, a user may search for content corresponding to "Yankees," and search results returned in response to this search may include scheduled programming content for New York Yankees baseball games, bundled service content from a movie streaming service for movies related to the New York Yankees, music content related to the band "Damn Yankees," and electronic book content for the electronic book "A Connecticut Yankee in King Arthur's Court" by Mark Twain. Rather than showing all movies the bundled service includes related to the Yankees, the search results may initially show an image for a movie streaming service which includes multiple movies related to the search term "Yankees." Upon selecting the image for the movie streaming service using, for example, a selection voice tag associated with the image, one or more movies available from that streaming service and corresponding to the search term "Yankees" may be displayed in the search results. Hierarchically-presented search results may have any number of hierarchical levels, as embodiments of the invention are not limited in this respect.

Another illustrative example of content that can be represented hierarchically is songs in a music library. For example, a user may want to play a song by Metallica, but may not remember the name of the song. To search for the song, the user may initiate a search for "Metallica," and the search results that are returned may include multiple albums for Metallica stored locally on a local data source associated with electronic device and/or one or more network connected music data sources (e.g., databases) that include music from Metallica. In some embodiments, the search results may be presented as a series of images for album covers for the different Metallica albums and the user may be prompted to select one of the albums from the search results (e.g., by using selection voice tags associated with each album image). Upon selection of one of the albums, the selected album may be expanded to reveal search results for one or more of the songs associated with album, and the user may select one of the songs on the album for playback. Accordingly, in this respect, search results may be presented in a hierarchical manner such that sequential selections of search results may allow the user to navigate through the search results to identify the content the user wants to playback on the electronic device.

In some embodiments, voice tags may be employed that instruct the user how to interact with different components of the user interface. Content-neutral voice tags are labels that are independent of the content that the voice tag identifies. An example of a content-neutral voice tag is the selection voice tags (1, 2, 3, 4) illustrated in FIG. 5, which allow the user to select one of the search results without having to speak the name of the content identifying the search result. Thus, content-neutral voice tags do not identify the content itself with which they are associated, but merely identify a slot or position of the search result to which the content is assigned. By using content-neutral voice tags, the user is provided with a set of voice tags that facilitates a consistent user experience when interacting with the visual search interface. Additionally, using content-neutral voice tags allows the user to use less speech to invoke commands that would be required if the voice tags were created based, at least in part, on the content the tags identified. Use of content-neutral voice tags also allow the use of a fixed grammar (e.g., numbers, letters) that can result in more accurate ASR for content that may have unique names, etc.

In some embodiments, the user may be able to provide input (e.g., via voice) that results in the activation of more than one type of command or interaction. For example, a user may say, "watch 1." In response, two interactions take place: (1) the first item in the search results may be selected and (2) the selected item may be played. In this way a single input may cause multiple commands or interactions to be executed without the user having to issue separate commands. Such a system enables the user to use natural input (e.g., speech) to control the electronic device.

Searches may be performed for any type of content has described above, including searches for video clips on YouTube™, Hulu™, or any other video-sharing website or web service. Additionally, the user may search for music content, as described above, in one music libraries stored locally or accessible via a network (e.g., the Internet). The user may have the ability to restrict a search to a particular type of content such as music, videos, or scheduled programming content, such that the search results only include a particular type of content for which the user desires to search. To this end, the search interface may be associated with advanced searching capabilities that may be configured using voice input and/or other input modalities.

In some embodiments, a piece of content displayed in the search results may include multiple tags (e.g., voice tags), with one tag identifying the content, and another tag indicating an action to perform with the content (e.g., watch, record, or purchase the content). The number of tags associated with search results for a search interface is not a limitation of embodiments of the invention.

Figure 7:
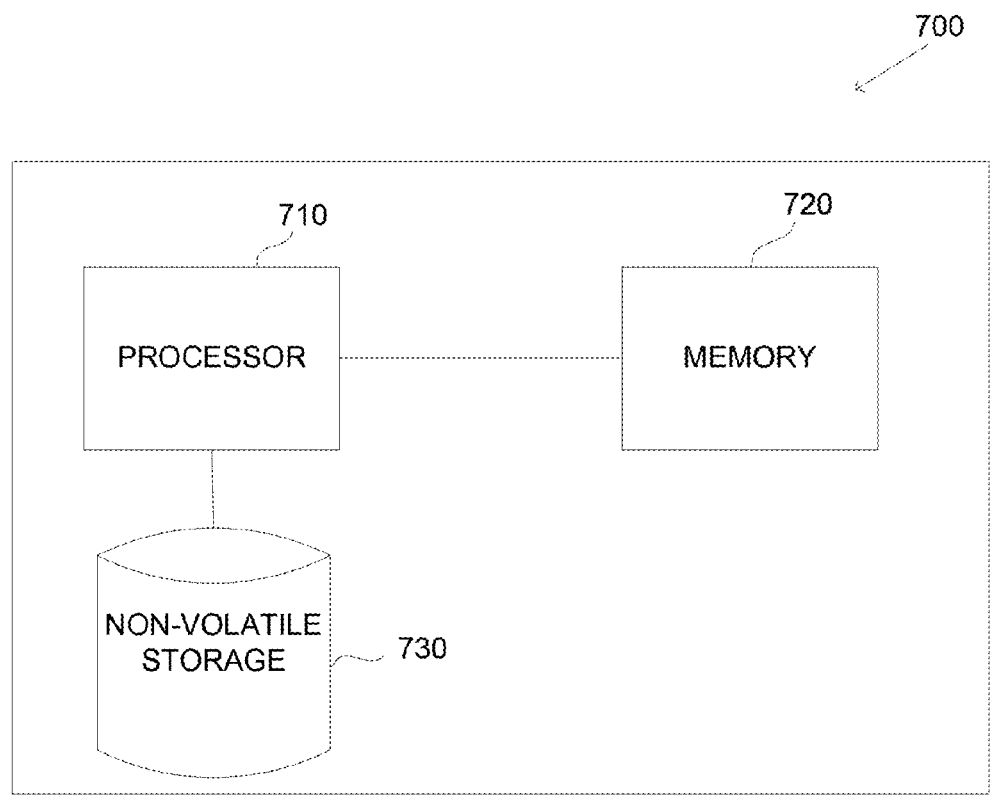
FIG. 7 is an exemplary computer system that may be used to implement some embodiments of the invention.

An illustrative implementation of a computer system 700 that may be used in connection with any of the embodiments of the invention described herein is shown in FIG. 7. The computer system 700 may include one or more processors 710 and one or more computer-readable non-transitory storage media (e.g., memory 720 and one or more non-volatile storage media 730). The processor 710 may control writing data to and reading data from the memory 720 and the non-volatile storage device 730 in any suitable manner, as the aspects of the present invention described herein are not limited in this respect. To perform any of the functionality described herein, the processor 710 may execute one or more instructions stored in one or more computer-readable storage media (e.g., the memory 720), which may serve as non-transitory computer-readable storage media storing instructions for execution by the processor 710.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of presenting search results on a visual user interface for a digitally-tunable electronic device configured to display scheduled programming content, the method comprising:

receiving a free-form voice input comprising a search query, wherein the free-form voice input is not constrained to a specific voice command recognizable by a command grammar associated with the digitally-tunable electronic device;

storing for each of a plurality of intended actions, an association between the intended action and one or more terms, each of which comprises at least one word, wherein none of the one or more terms is included as a portion of a specific voice command included in a command grammar associated with the digitally-tunable electronic device;

determining an intended action to perform based, at least in part, on the free-form voice input, wherein the determined intended action is selected from the group consisting of listening to music content, watching video content, and playing content that is always accessible, wherein determining the intended action comprises selecting the intended action from among the plurality of intended actions by determining that the free-form voice input includes at least one of the one or more terms associated with the intended action;

selecting, based on the determined intended action, a plurality of data sources to search, wherein the selected plurality of data sources to search include at least one scheduled programming content data source and at least one bundled service content data source;

searching the selected plurality of data sources based, at least in part, on the search query and the determined intended action;

ordering results of the search based, at least in part, on which of the selected plurality of data sources each result of the results of the search is associated with; and presenting the ordered results of the search on the user interface, wherein the ordered results of the search combine at least one first result corresponding to scheduled programming content returned from the at least one scheduled programming content data source and at least one second result corresponding to bundled service content returned from the at least one bundled service content data source.

2. The method of claim 1, wherein the at least one second result includes at least one bundled service result that, when selected, displays multiple results from the corresponding bundled service data source.

3. The method of claim 1, wherein the at least one bundled service data source comprises a data source for a web-based service.

4. The method of claim 1, wherein the at least one bundled service data source comprises a local data source associated with the electronic device.

5. The method of claim 1, wherein the at least one bundled service data source comprises a plurality of data sources connected via a network.

6. The method of claim 1, wherein the at least one bundled service data source comprises a data source of on-demand content.

7. The method of claim 1, wherein presenting the results of the search comprises presenting an image corresponding to at least one of the results of the search.

8. A non-transitory computer-readable storage medium encoded with a plurality of instructions that, when executed by at least one computer perform a method of presenting search results on a visual user interface for a digitally-tunable electronic device configured to display scheduled programming content, the method comprising:

receiving a free-form voice input comprising a search query, wherein the free-form voice input is not constrained to a voice command recognizable by a command grammar associated with the digitally-tunable electronic device;

storing for each of a plurality of intended actions, an association between the intended action and one or more terms, each of which comprises at least one word, wherein none of the one or more terms is included as a portion of a specific voice command included in a command grammar associated with the digitally-tunable electronic device;

determining an intended action to perform based, at least in part, on the free-form voice input, wherein the determined intended action is selected from the group consisting of listening to music content, watching video content, and playing content that is always accessible, wherein determining the intended action comprises selecting the intended action from among the plurality of intended actions by determining that the free-form voice input includes at least one of the one or more terms associated with the intended action;

selecting, based on the determined intended action, a plurality of data sources to search, wherein the selected plurality of data sources to search include at least one scheduled programming content data source and at least one bundled service content data source;

searching the selected plurality of data sources based, at least in part, on the search query and the determined intended action;

ordering results of the search based, at least in part, on which of the selected plurality of data sources each result of the results of the search is associated with; and presenting the ordered results of the search on the user interface, wherein the ordered results of the search combine at least one first result corresponding to scheduled programming content returned from the at least one scheduled programming content data source and at least one second result corresponding to bundled service content returned from the at least one bundled service content data source.

9. The non-transitory computer-readable storage medium of claim 8, wherein the at least one second result includes at least one bundled service result that, when selected, displays multiple results from the corresponding bundled service data source.

10. The non-transitory computer-readable storage medium of claim 8, wherein the at least one bundled service data source comprises a data source for a web-based service.

11. The non-transitory computer-readable storage medium of claim 8, wherein the at least one bundled service data source comprises a local data source associated with the electronic device.

12. The non-transitory computer-readable storage medium of claim 8, wherein the at least one bundled service data source comprises a plurality of data sources connected via a network.

13. The non-transitory computer-readable storage medium of claim 8, wherein the at least one bundled service data source comprises a data source of on-demand content.

14. The non-transitory computer-readable storage medium of claim 8, wherein presenting the results of the search comprises presenting an image corresponding to at least one of the results of the search.

15. A digitally-tunable electronic device configured to display scheduled programming content, the electronic device comprising:
at least one storage device configured to store for each of a plurality of intended actions, an association between the intended action and one or more terms, each of which comprises at least one word, wherein none of the one or more terms is included as a portion of a specific voice command included in a command grammar associated with the digitally-tunable electronic device; and
at least one processor programmed to:
receive a free-form voice input comprising a search query, wherein the free-form voice input is not constrained to a voice command recognizable by a command grammar associated with the digitally-tunable electronic device;
determine an intended action to perform based, at least in part, on the free-form voice input, wherein the determined intended action is selected from the group consisting of listening to music content, watching video content, and playing content that is always accessible, wherein determining the intended action comprises selecting the intended action from among the plurality of intended actions by determining that the free-form voice input includes at least one of the one or more terms associated with the intended action;
select, based on the determined intended action, a plurality of data sources to search, wherein the selected plurality of data sources to search include at least one scheduled programming content data source and at least one bundled service content data source;
search the selected plurality of data sources based, at least in part, on the search query and the determined intended action;
order results of the search based, at least in part, on which of the selected plurality of data sources each result of the results of the search is associated with; and
present the ordered results of the search on the user interface, wherein the ordered results of the search combine at least one first result corresponding to scheduled programming content returned from the at least one scheduled programming content data source and at least one second result corresponding to bundled service content returned from the at least one bundled service content data source.

16. The digitally-tunable electronic device of claim 15, wherein the at least one second result includes at least one bundled service result that, when selected, displays multiple results from the corresponding bundled service data source.

17. The digitally-tunable electronic device of claim 15, wherein the at least one bundled service data source comprises a data source for a web-based service.

18. The digitally-tunable electronic device of claim 15, wherein the at least one bundled service data source comprises a local data source associated with the electronic device.

19. The digitally-tunable electronic device of claim 15, wherein the at least one bundled service data source comprises a plurality of data sources connected via a network.

20. The digitally-tunable electronic device of claim 15, wherein the at least one bundled service data source comprises a data source of on-demand content.

* * * * *